US009233555B2

United States Patent
Berry et al.

(10) Patent No.: US 9,233,555 B2
(45) Date of Patent: Jan. 12, 2016

(54) SYSTEM AND METHOD FOR CONTROLLING MULTIPLE LIGHT SOURCES OF A LASER SCANNING SYSTEM IN AN IMAGING APPARATUS

(75) Inventors: John Bruce Berry, Lexington, KY (US); William Pohl Corbett, Jr., Lexington, KY (US)

(73) Assignee: Lexmark International, Inc. KY (US)

( * ) Notice: Subject to any disclaimer, the term of this patent is extended or adjusted under 35 U.S.C. 154(b) by 473 days.

(21) Appl. No.: 13/616,634

(22) Filed: Sep. 14, 2012

(65) Prior Publication Data
US 2014/0078237 A1    Mar. 20, 2014

(51) Int. Cl.
| | |
|---|---|
| *B41J 2/44* | (2006.01) |
| *B41J 2/45* | (2006.01) |
| *B41J 2/455* | (2006.01) |
| *B41J 2/47* | (2006.01) |
| *G03G 15/04* | (2006.01) |
| *H04N 1/113* | (2006.01) |
| *G06K 15/12* | (2006.01) |
| *G06K 15/02* | (2006.01) |

(52) U.S. Cl.
CPC  *B41J 2/471* (2013.01); *B41J 2/442* (2013.01); *B41J 2/45* (2013.01); *B41J 2/455* (2013.01); *G03G 15/04045* (2013.01); *G06K 15/1204* (2013.01); *G06K 15/129* (2013.01); *G06K 15/1894* (2013.01); *H04N 1/113* (2013.01); *H04N 2201/04748* (2013.01)

(58) Field of Classification Search
CPC ............... B41J 2/442; B41J 2/45; B41J 2/455
USPC .................. 347/132, 142, 237, 247
See application file for complete search history.

(56) References Cited

U.S. PATENT DOCUMENTS

2008/0240756 A1\* 10/2008 Kurose et al. ................... 399/51

\* cited by examiner

*Primary Examiner* — Kristal Feggins
*Assistant Examiner* — Kendrick Liu

(57) ABSTRACT

A scanning system for use in an imaging apparatus includes a first light source and a second light source for emitting light beams for generating an image. A driver circuitry has first and second outputs connected to the first and second light sources, respectively, for controlling the first and second light sources. A signal transmitter includes a first interface for communicating a clock signal to the driver circuitry and a second interface for communicating an image information signal to the driver circuitry. During a clock cycle of the clock signal, the driver circuitry captures a first bit information from the image information signal at a rising edge of the clock signal and a second bit information from the image information signal at a falling edge of the clock signal. Thereafter, the driver circuitry drives the first and second light sources based on the first and second bit information captured, respectively.

20 Claims, 13 Drawing Sheets

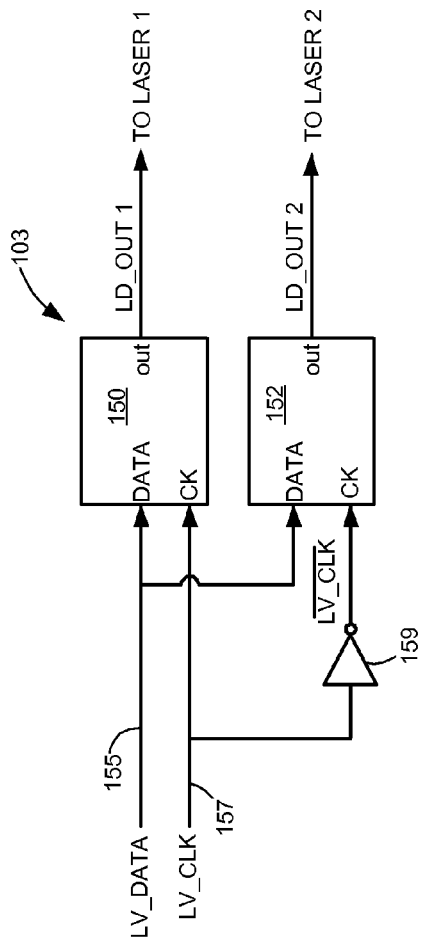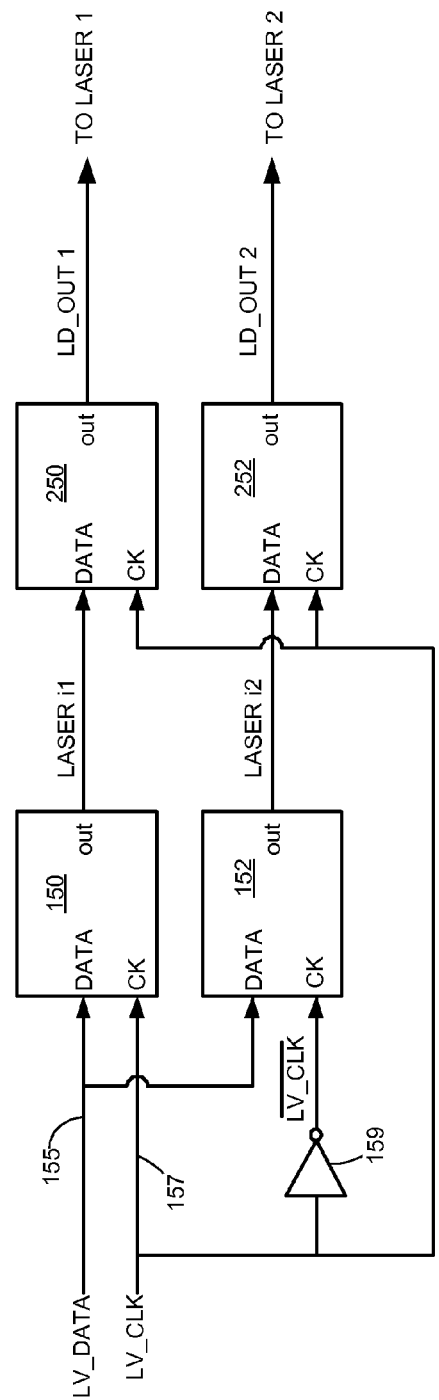

SYSTEM AND METHOD FOR CONTROLLING MULTIPLE LIGHT SOURCES OF A LASER SCANNING SYSTEM IN AN IMAGING APPARATUS

CROSS REFERENCES TO RELATED APPLICATIONS

None

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to electrophotographic imaging devices such as a printer or multifunction device having printing capability, and in particular, to laser scanning systems employing multiple light sources.

2. Description of the Related Art

Electrophotographic image forming devices typically form images by scanning light across the surface of a photoconductive surface. Typically, a video signal causes a light source, such as a laser or laser diode, to pulse on and off as its laser light scans across the surface of the photoconductive surface. Those select portions of the photoconductive surface that are exposed to the laser light are electrically discharged thereby forming a latent electrostatic image. A charged developer material, such as toner, is brought into contact with the photoconductive surface by a developer roller such that the charged toner attaches to the discharged areas of the photoconductive surface. The toner on the photoconductive surface is then transferred onto a recording medium, such as a media sheet or a transfer belt for subsequent transfer to a media sheet.

Typically, the video signal is produced by an integrated circuit, such as an application specific integrated circuit (ASIC), and transmitted over an electrical conductor to a laser driver which in turn drives the light source based on the video signal. In laser scanning systems, most especially in laser color printers, it is common practice to utilize multiple light sources that are driven by one or more laser drivers to form latent images on the photoconductive surface. The ASIC produces multiple video data signals that are simultaneously sent over several parallel channels to control each unique light source. For example, as shown in FIG. 1 illustrating an 8 laser system, there may be eight different video data signals DATA1 to DATA8 transmitted over eight separate channels 5 to multiple laser drivers 7 to control eight different laser diodes 9. In this case, a single channel 5 is dedicated to carry video data for a single laser diode 9.

The use of multiple light sources may improve the overall throughput of the imaging apparatus. However, implementing such configuration, where the number of unique signals for communicating video information to the multiple laser diodes would require an increase in the channels over which the unique signals are transmitted, results in higher manufacturing costs. Power dissipation may also increase due the increased number of channels. Additionally, as more light sources are used, more interfaces would be required which occupy relatively large portions of valuable silicon area in both the ASIC and the laser drivers. Moreover, the additional channels used to accommodate connections between the interfaces may increase the overall size of circuitries within the laser scanning system.

Accordingly, there is a need for a solution to more efficiently communicate video information in scanning systems implementing multiple light sources.

SUMMARY

Embodiments of the present disclosure provide laser scanning systems that utilize a smaller interface in driving multiple light sources. In an example embodiment, an imaging apparatus includes a first light source and a second light source controllable to emit light beams and a driver circuit for controlling the first and second light sources. The imaging apparatus also includes a first differential signal channel for communicating a clock signal to the driver circuit and a second differential signal channel for transmitting a bit stream containing image information to the driver circuit. The driver circuit is configured to capture a first bit from the bit stream in response to one of a rising edge and a falling edge of the clock signal, capture a second bit from the bit stream in response to the other of the rising edge and the falling edge of the clock signal, and drive the first and second light sources based on the captured first and second bits, respectively. The first and second light sources are driven by the driver circuit based on the captured first and second bits, respectively, substantially at the same time at a subsequent edge of the clock signal following the capture of the first and second bits.

In another example embodiment, the imaging apparatus further includes a third light source and a fourth light source controlled by the driver circuit to emit light beams. The driver circuit is further configured to capture a third bit and a fourth bit from the bit stream during the same clock cycle in which the first and second bits are captured but at times other than during an occurrence of an edge of the clock signal, and drive the third and fourth light sources based on the captured third and fourth bits, respectively. The first, second, third, and fourth light sources are driven by the driver circuit based on the captured first, second, third, and fourth bits, respectively, at substantially the same time in a subsequent clock cycle of the clock signal.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings, wherein:

FIG. 5A is a block diagram of a laser driver circuit of the driver circuitry in FIG. 4 according to one example embodiment;

FIG. 5B is a block diagram of a laser driver circuit of the driver circuitry in FIG. 4 according to one example embodiment;

DETAILED DESCRIPTION

Figure 1:
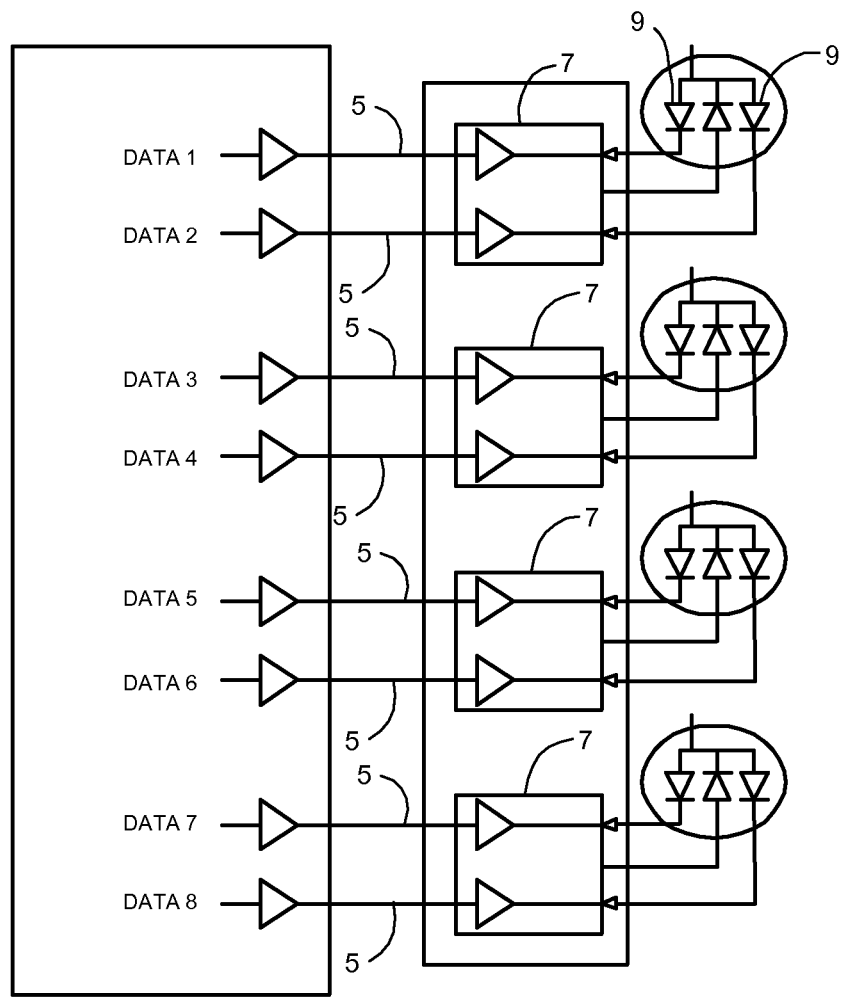
FIG. 1 is a prior art circuit diagram illustrating multiple laser drivers connected to a controller for controlling multiple light sources.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

Figure 2:
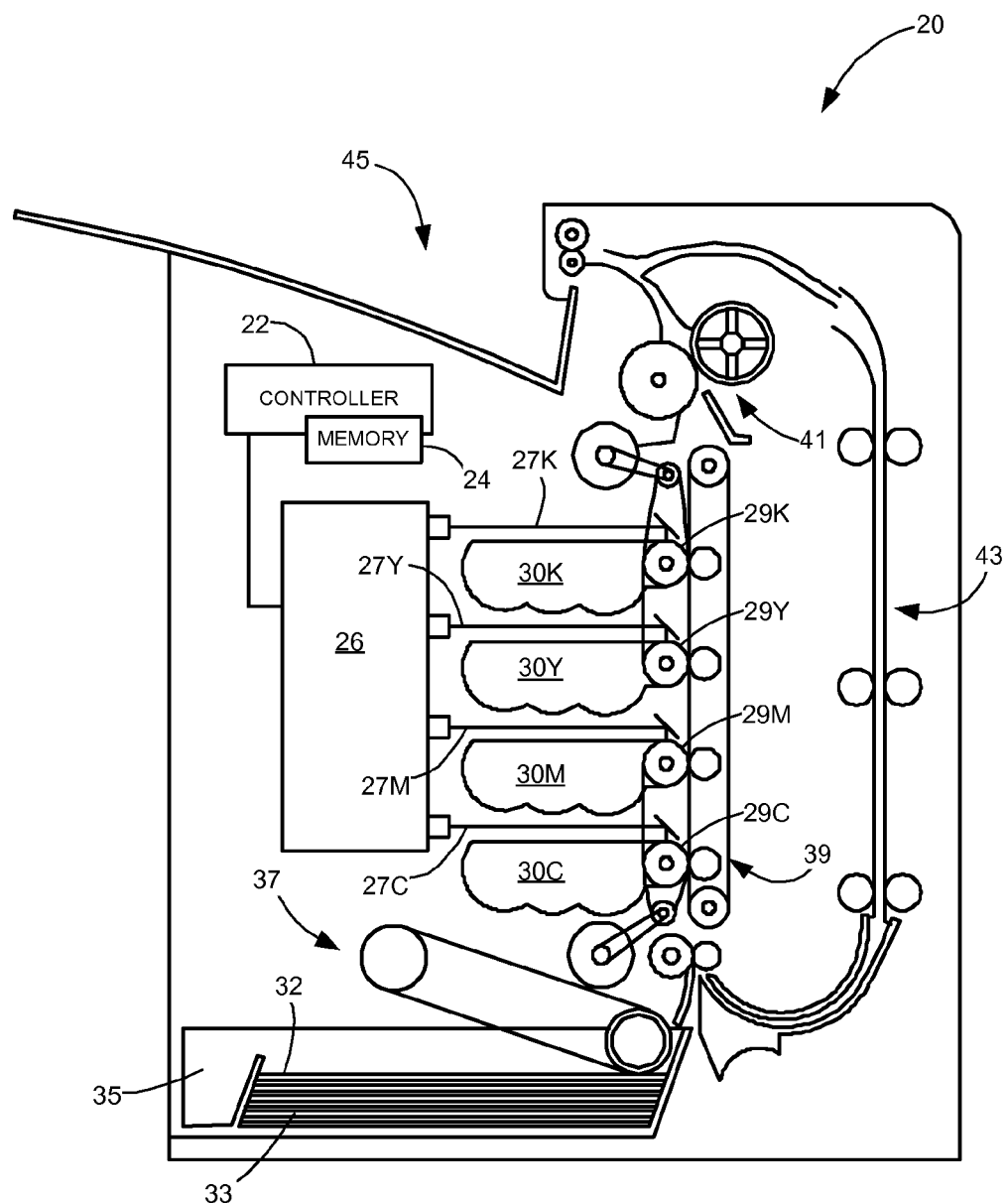
FIG. 2 is a schematic view of an imaging apparatus according to one example embodiment.

FIG. 2 illustrates an imaging apparatus 20 according to an example embodiment. An image to be printed is electronically transmitted to a main system controller 22 from a source such as an external device (not shown). The main system controller 22 may include one or more processors, and other software, firmware and/or hardware logic necessary to control the functions of imaging apparatus 20, and may be implemented as one or more ASICs. Controller 22 may also include or be associated with a memory 24 which may be any volatile and/or non-volatile memory such as, for example, random access memory (RAM), read only memory (ROM), flash memory and/or non-volatile RAM (NVRAM). Alternatively, memory 24 may be in the form of a separate electronic memory (e.g., RAM, ROM, and/or NVRAM), a hard drive, a CD or DVD drive, or any memory device convenient for use with controller 22.

In the example embodiment shown, imaging apparatus 20 is illustrated as a color laser printer for purposes of discussion and should not be regarded as limiting. For color operation, the image to be printed may be de-constructed into four bitmap images or image data, each corresponding to an associated one of the cyan, yellow, magenta and black (CYMK) image planes, for example, by the main system controller 22. The main system controller 22 may initiate an imaging operation whereby a laser scanning unit (LSU) 26 may output first, second, third and fourth modulated light beams 27K, 27Y, 27M, and 27C.

In one example embodiment, LSU 26 may be configured to emit first modulated light beam 27K which forms a latent image on a photoconductive surface or drum 29K of a first image forming station 30K based upon the bitmap image data corresponding to the black image plane. Second modulated light beam 27Y from LSU 26 forms a latent image on a photoconductive drum 29Y of a second image forming station 30Y based upon the bitmap image data corresponding to the yellow image plane. Third modulated light beam 27M forms a latent image on a photoconductive drum 29M of a third image forming station 30M based upon the bitmap image data corresponding to the magenta image plane. Similarly, fourth modulated light beam 27C forms a latent image on a photoconductive drum 29C of a fourth image forming station 30C based upon the bitmap image data corresponding to the cyan image plane. In another example embodiment, each line segment 27 in FIG. 2 represents multiple light beams such that a latent image on each photoconductive drum 29 is formed by two or more modulated light beams from LSU 26. During the imaging operation, each modulated light beam 27 sweeps across its corresponding photoconductive drum 29 in a scan direction that is perpendicular to a media process direction.

The main system controller 22 may also coordinate the timing of a printing operation to correspond with the imaging operation, whereby a top sheet 32 of a stack of media 33 is picked up from a media tray 35 by a pick mechanism 37 and is delivered to a media transport belt 39. The media transport belt 39 may carry the sheet 32 past each of the four image forming stations 30, which apply toner to the sheet 32 in patterns corresponding to the latent images written to their associated photoconductive drums 29. The media transport belt 39 may then carry the sheet 32 with the toned mono or composite color image registered thereon to a fuser assembly 41. Alternatively, the photoconductive drums 29 may transfer toned image to an intermediate transfer belt that subsequently carries the toned image to the sheet of media so that toner transfer to the media sheet occurs in two steps. The media transport belt may then carry the sheet of media with the toned image to the fuser assembly 41. The fuser assembly 41 includes a nip that applies heat and pressure to adhere the toned image to the sheet 32. Upon exiting the fuser assembly 41, the sheet 32 is may either be fed into a duplexing path 43 for printing on a second surface thereof, or ejected from the imaging apparatus 20 to an output area 45.

Imaging apparatus 20 is illustrated in FIG. 2 and described above as a color imaging device in which toner from each image forming station 30 is transferred to a sheet of media in one step. It is understood that imaging apparatus 20 may be a color imaging device in which toner is transferred from each image forming station 30 onto an intermediate transfer mechanism in a first step, and from the intermediate transfer mechanism to a media sheet in a second step. It is further understood that imaging apparatus 20 may be a monochrome imaging device having only one image forming station 30 for depositing black toner to a media sheet. The general architectures of color imaging devices transferring toner in two steps and monochrome imaging devices are known and will not be discussed in further detail herein for reasons of simplicity.

Figure 3:
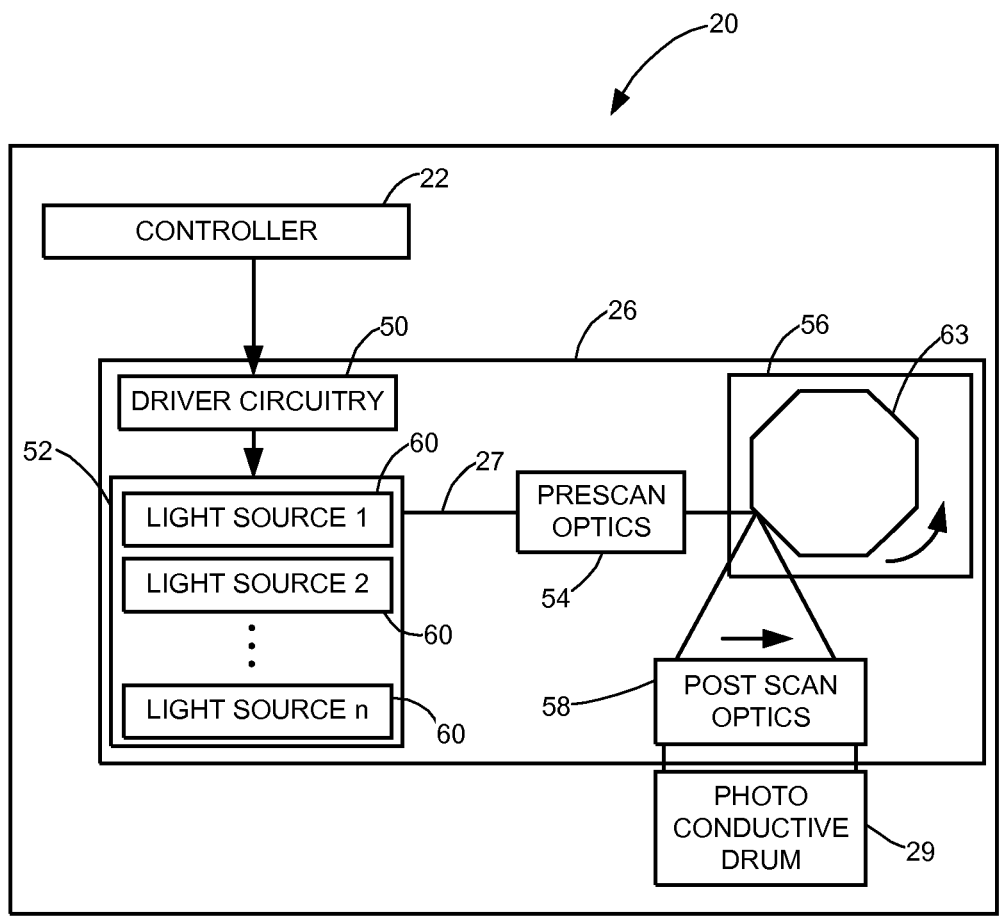
FIG. 3 is a schematic view illustrating a laser scanning unit of the imaging apparatus in FIG. 2.

Referring now to FIG. 3, a schematic of at least a portion of LSU 26 in communication with controller 22 is shown. LSU 26 includes driver circuitry 50, a light assembly 52, pre-scan optics 54, a scanning device 56, and post-scan optics 58. Driver circuitry 50 is communicatively coupled to controller 22 for receiving video/image information and/or control data that may be utilized to set and/or vary the laser power used by each of light source 60 of light assembly 52. In one example embodiment, driver circuitry 50 may include a single laser driver that may be utilized to set the laser power used by all light sources 60. In another example embodiment, driver circuitry 50 may include multiple laser drivers that may each be utilized to set the laser power used by one or more light sources that are associated with the cyan, magenta, yellow and black (CMYK) image planes, or alternatively, a combination of light sources 60 associated with different color CMYK image planes. Light sources 60 may each be implemented, for example, using a laser diode or any other suitable light source.

Pre-scan optics 54 may include one or more collimating lenses, pre-scan lenses and/or other optical system components as the specific implementation requires to direct and focus each of the modulated beams 27 emitted by light sources 60 towards scanning device 56. Scanning device 56 may include a polygon mirror 63 having a plurality of facets and controlled to rotate at a fixed rotational velocity during imaging operations so as to create scan lines on photoconductive drum 29 in a forward direction. In the alternative, scanning device 56 may include at least one scanning oscillator, such as a torsion oscillator, controlled to operate bi-directionally at a scanning frequency to create scan lines on photoconductive drum 29 in both forward and reverse directions. Post-scan optics 58 may include post-scan lenses and/or other optical system components used to direct each modulated beam 27 to their corresponding photoconductive drums 29. Post-scan optical components may each be provided as part of the LSU 26 or such components may be otherwise mounted within the imaging apparatus 20.

During an imaging operation, image data corresponding to an image to be printed may be converted by controller 22 into laser modulation data. Controller 22 may further initiate an operation whereby the laser modulation data associated with at least one light source 60 is communicated to driver circuitry 50. The laser modulation data may be utilized by the driver circuitry 50 to modulate at least one of the light sources 60 so that LSU 26 outputs one or more modulated light beams 27. Each light beam 27 emitted from its corresponding light source 60 may pass through pre-scan optics 54 and strike polygon mirror 63 of scanning device 56. Light beams 27 may be swept by the polygon mirror 63 or torsion oscillator, pass through post-scan optics 58 and directed to their respective photoconductive drums 29. During the imaging operation, each modulated light beam 27 sweeps across corresponding photoconductive drum 29 in a scan direction as the photoconductive drum 29 advances or rotates in a process direction.

Figure 4:
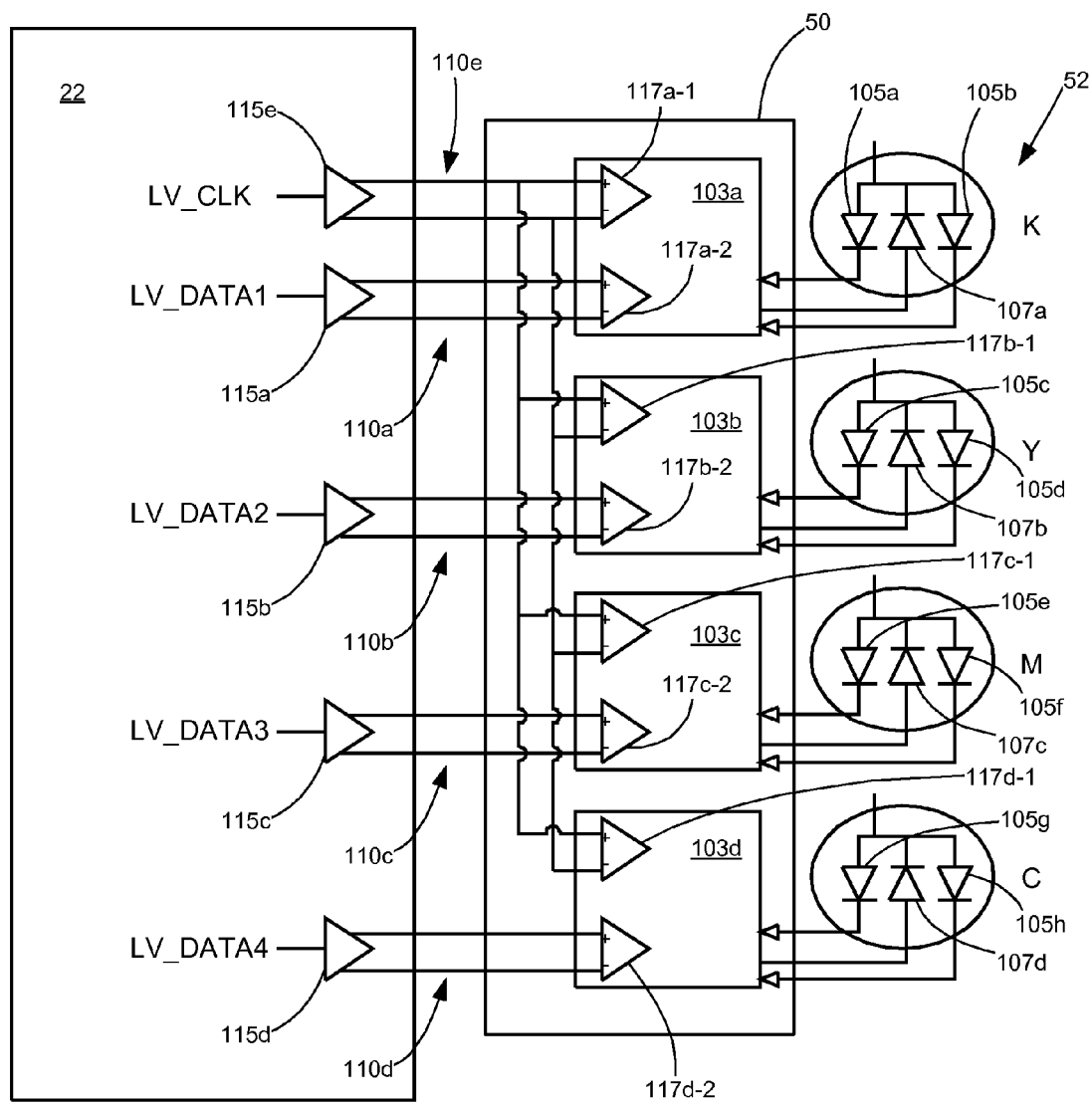
FIG. 4 is a circuit diagram illustrating driver circuitry of the laser scanning unit in FIG. 3 according to one example embodiment.

In accordance with example embodiments of the present disclosure, FIG. 4 shows a circuit diagram illustrating driver circuitry 50 of LSU 26 in communication with controller 22 utilizing four laser driver circuits 103 with a reduced interface to communicate laser modulation information to the laser driver circuits 103, compared to the arrangement illustrated in FIG. 1. As shown, first driver circuit 103a is coupled to laser diodes 105a, 105b, second laser driver circuit 103b is coupled to laser diodes 105c, 105d, third laser driver circuit 103c is coupled to laser diodes 105e, 105f, and fourth laser driver circuit 103d is coupled to laser diodes 105g, 105h. Each laser driver circuit 103 may also be coupled to a corresponding laser output feedback device 107 which may be optically coupled to associated laser diodes 105. Each laser output feedback device 107 may sense the output power of associated laser diodes 105 for use in calibration control operations, and may be implemented as a photodetector, such as a positive-intrinsic-negative (PIN) photodiode. During an imaging operation, each laser driver 103 modulates each connected laser diode 105 in response to video information and control data communicated from controller 22.

The laser driver circuits 103 may be connected to controller 22 via several signal lines or channels 110. In one example embodiment, each channel 110 may include a low-voltage differential signal (LVDS) channel comprising two signal lines for communicating a differential signal, such as an LVDS image data pair, from controller 22 to laser driver circuits 103. Controller 22 and laser driver circuits 103 are shown in FIG. 4 to include integrated LVDS interfaces, such as LVDS transmitters 115 (in controller 22) and LVDS receivers 117 (in laser driver circuits 103). Controller 22 may generate LVDS signals based upon image data for each of the CMYK color image planes and transmit the LVDS signals through the LVDS transmitters 115 to the LVDS receivers 117 at the laser driver circuits 103. However, it will also be appreciated that, alternatively, an LVDS interface device which, for example, may take the form of an ASIC that is external to controller 22 may receive laser modulation data containing image data from controller 22 and generate differential signals based upon the laser modulation data for transmission over to the LVDS receivers 117 at the laser driver circuits 103.

Laser driver circuits 103 may have their first LVDS receivers 117-1 coupled to the LVDS transmitter 115e of controller 22. Controller 22 may use LVDS transmitter 115e to transmit a common reference clock signal LV_CLK to each of the laser driver circuits 103. The second LVDS receiver 117-2 of each of the laser driver circuits 103 may each be connected to a corresponding LVDS transmitter 115 used by controller 22 to transmit laser modulation data LV_DATA 1, LV_DATA 2, LV_DATA 3, and LV_DATA 4. For example, LVDS transmitter 115a of controller 22 may be connected to LVDS receiver 117a-2 of laser driver circuit 103a for transmitting laser modulation signal LV_DATA 1 containing image data to modulate the laser beams emitted by laser diodes 105a and 105b connected to laser driver circuit 103a. Similarly, laser modulation signals containing image data used to modulate laser beams emitted by corresponding laser diodes 105 connected to laser driver circuits 103b, 103c, and 103d may be transmitted by controller 22 using LVDS transmitters 115b, 115c, and 115d, respectively.

With each laser driver circuit 103 having a single LVDS receiver 117-2 for receiving laser modulation signal from controller 22 to modulate two laser diodes 105, image data for two laser diodes may be encoded into a single bit stream prior to being outputted as a laser modulation signal by one of the LVDS transmitters 115. An encoding technique for generating the single bit stream by controller 22 and/or transmitters 115 may utilize a high speed clock having a frequency that is greater than the frequency of the clock signal LV_CLK. Transmitters 115 may, for example, include or be associated with flip flops for temporarily storing the image bit values to be included in the single bit stream, multiplexer circuitry receiving an output of each flip flop, and a counter clocked by the high speed clock and controlling the multiplexer circuitry for cycling to the output thereof each flip flop output during a clock cycle of clock signal LV_CLK. The output of the multiplexer circuitry may form the single bit stream encoded with multiple image bit values.

In one example embodiment, laser diodes 105 that are connected to a common laser driver circuit 103 may correspond to one of the CMYK color image planes such that laser modulation signal transmitted over a single channel is used to modulate laser diodes that form latent images on a common photoconductive drum 29. For example, as shown in FIG. 4, laser diodes 105a, 105b that are connected to laser driver circuit 103a may be associated with the black (K) image plane, laser diodes 105c, 105d connected to laser driver circuit 103b may be associated with the yellow (Y) image plane, laser diodes 105e, 105f connected to laser driver circuit 103c may be associated with the magenta (M) image plane, and laser diodes 105g, 105h connected to laser driver circuit 103d may be associated with the cyan (C) image plane. Alternatively, other combinations of associating light sources and driver circuits may be implemented.

FIG. 5A illustrates a simplified functional block diagram of each laser driver circuit 103 according to one example embodiment. Each laser driver circuit 103 may include two substantially parallel connected flip-flops 150, 152. Line 155 may be connected to the output of receiver 117-2 such that image data, i.e., one of LV_DATA 1, LV_DATA 2, LV_DATA 3, and LV_DATA 4, from controller 22 may be distributed to each of the two flip-flops 150, 152 via line 155. Line 157 may be connected to the output of receiver 117-1 so that it carries clock signal LV_CLK from controller 22. Clock signal LV_CLK may be directly provided to flip-flop 150. However, prior to being received by flip-flop 152, clock signal LV_CLK may pass through a logic inverter 159 such that flip-flop 152 receives an inverted form of clock signal LV_CLK. Both non-inverted and inverted LV_CLK signals may be used to control the outputs of flip-flops 150, 152 connected to laser diodes LASER 1, LASER 2, respectively. Laser diodes LASER 1 and LASER 2 may correspond to the laser diodes 105 connected to a single driver circuit 103, such as, for example, laser diodes 105a and 105b for driver circuit 103a. For purpose of discussion, flip-flops 150 and 152 will be described as capturing data appearing at its DATA input on the rising edge of the signal appearing at its CK input. It is understood, however, that data capture may occur on the falling edge of the signal appearing at the CK input.

Figures 6A, 6B:
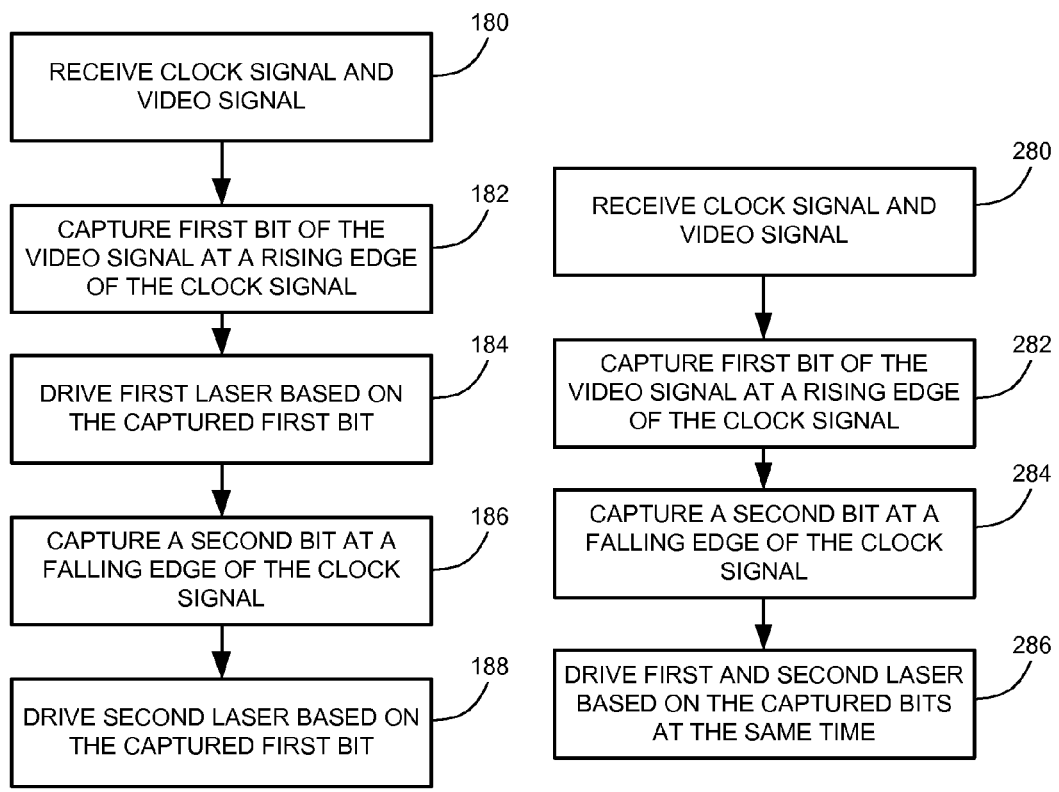
FIG. 6A is a flowchart illustrating a method of driving multiple light sources in accordance with the block diagram shown in FIG. 5A.
FIG. 6B is a flowchart illustrating a method of driving multiple light sources in accordance with the block diagram shown in FIG. 5B.

FIG. 6A illustrates a process of driving two laser diodes by each one of laser driver circuits 103 in accordance with the example embodiment shown in FIG. 5A. At block 180, flip-flop 150 may receive laser modulation data containing image information in the form of, for example, a bit stream LV_DATA, for modulating two laser diodes, and clock signal LV_CLK from controller 22. During a clock cycle of clock signal LV_CLK, flip-flop 150 may capture a first bit information, such as one bit, from the bit stream LV_DATA at a rising edge of clock signal LV_CLK (block 182). Following the capture of the first bit information, flip-flop 150 drives its output to the captured first bit information for driving laser diode LASER 1. When clock signal LV_CLK is at the rising edge, the clock edge seen by flip-flop 152 due to logic inverter 159 is a falling clock edge. As such, flip-flop 152 does not capture any bit from data stream LV_DATA during occurrence of the rising edge of clock signal LV_CLK. Upon a falling edge of LV_CLK, the inverted version of clock signal LV_CLK is a rising edge which is seen by flip-flop 152. Accordingly, flip-flop 152 may capture a second bit information from the bit stream LV_DATA at block 186 during the falling edge of clock signal LV_CLK. The output of flip-flop 152 may then be used to drive laser diode LASER 2 (block 188). In other words, each laser driver circuit 103 may capture a first bit of information from a data stream at a rising edge of clock signal LV_CLK and a second bit of information from the same data stream LV_DATA at a falling edge of clock signal LV_CLK during the same clock cycle.

Figure 7A:
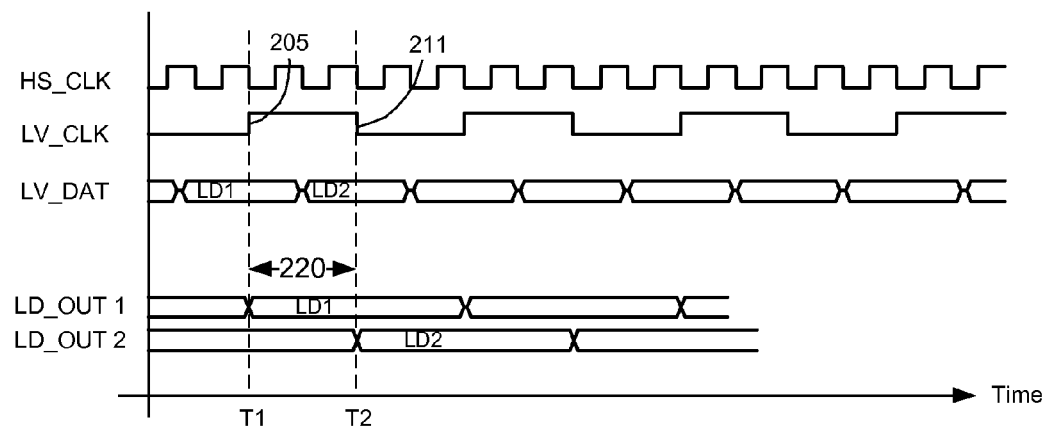
FIG. 7A is a timing diagram illustrating signals involved in the block diagram shown in FIG. 5A.

FIG. 7A shows an example timing diagram corresponding to the signals described above with respect to FIGS. 5a and 6a. In particular, the timing diagram shows waveforms of a high speed clock signal HS_CLK, clock signal LV_CLK, data stream LV_DATA, and signals LD_OUT 1 and LD_OUT 2 arriving at laser diodes LASER 1 and LASER 2, respectively. High speed clock signal HS_CLK signal may be used by controller 22 as a timing reference for various operations occurring within the system, including generating the clock signal LV_CLK and data stream LV_DATA. At time T1, the rising edge 205 of clock signal LV_CLK triggers flip-flop 150 to capture bit LD1 from bit stream LV_DATA, whereupon the output of flip-flop 152 drives laser diode LASER1 to the captured bit LD1 as seen on signal LD_OUT 1. Meanwhile, flip-flop 152 maintains its previously stored bit value during rising edge 205 of clock signal LV_CLK. At time T2, the falling edge 211 of clock signal LV_CLK causes flip-flop 150 to maintain bit value LD1 stored therein and causes flip-flop 152 to capture bit LD2 from LV_DATA. Laser diode LASER 2 is then driven based on bit LD2 as illustrated by signal LD_OUT 2.

In the example above, a scan line drawn by laser diode LASER 1 may lead a scan line drawn by laser diode LASER 2 by a scan skew 220 which is about one-half the period of clock signal LV_CLK, since each flip-flop 150, 152 drives associated laser diodes immediately after capturing bits of information from LV_DATA. In order to correct the scan skew 220 between laser diode LASER 1 and LASER 2, each laser driver circuit 130 may be configured to drive laser diodes LASER 1 and LASER 2 based on the captured bits LD1 and LD2, respectively, substantially at the same time at a subsequent edge of the clock signal following the capture of the bits.

FIG. 5B illustrates the functional block diagram shown in FIG. 5A with additional flip-flops 250, 252 for allowing each laser driver circuit 103 to be able to drive two laser diodes substantially at the same time based on recently captured bits, according to an example embodiment. Flip-flops 150 and 152 may take as input image data LV_DATA from controller 22. The outputs of flip-flops 150 and 152 may be buffered by associated flip-flops 250 and 252, respectively. Flip-flops 150, 250, and 252 may be clocked with the same clock signal LV_CLK from controller 22. On the other hand, flip-flop 152 may be clocked with an inverted form of clock signal LV_CLK due to inverter 159.

FIG. 6B illustrates a process flow of driving two laser diodes LASER1 and LASER2 using the configuration shown in FIG. 5B. At block 280, laser driver circuit 103 may receive bit stream LV_DATA and clock signal LV_CLK from controller 22. In particular, each of flip-flops 150 and 152 may commonly receive bit stream LV_DATA, and receive non-inverted and inverted forms of clock signal LV_CLK, respectively. At block 282, flip-flop 150 may capture a first bit from the bit stream LV_DATA at a rising edge of clock signal LV_CLK. At block 284, flip-flop 152 may capture a second bit from the bit stream at a falling edge of the clock signal LV_CLK. The data input for flip-flops 250, 252 receive the outputs of flip-flops 150 and 152, respectively. However, flip-flops 250, 252 may not latch the captured bits from flip-flops 150 and 152 until a subsequent rising edge of LV_CLK in the next clock cycle of clock signal LV_CLK. In this way, connected laser diodes LASER 1 and LASER 2 may be driven based on the captured bits substantially at the same time at block 286.

Figure 7B:
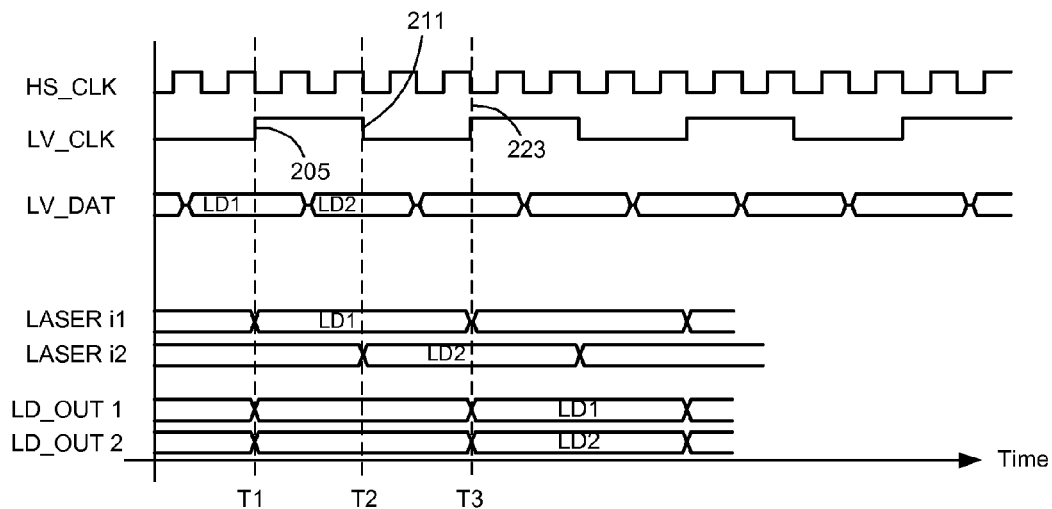
FIG. 7B is a timing diagram illustrating signals involved in the block diagram shown in FIG. 5B.

FIG. 7B shows an example timing diagram corresponding to the signals described above with respect to the example embodiment shown in FIGS. 5B and 6B. In this example, LASERi 1 and LASERi 2 represent the output of flip-flops 150 and 152, respectively, and signals LD_OUT 1 and LD_OUT 2 depict the signals provided to laser diodes LASER 1 and LASER 2, respectively. After LD1 and LD2 are captured by flip-flops 150 and 152 at time T1 and time T2, respectively, flip-flops 250 and 252 may hold respective bits LD1 and LD2 until the next rising edge of clock signal LV_CLK at time T3 in the next clock cycle of clock signal LV_CLK. As such, laser diodes LASER 1 and LASER 2 are driven based on bit values LD1 and LD2, respectively, substantially at the same time at time T3 as illustrated by LD_OUT 1 and LD_OUT 2.

Figure 8:
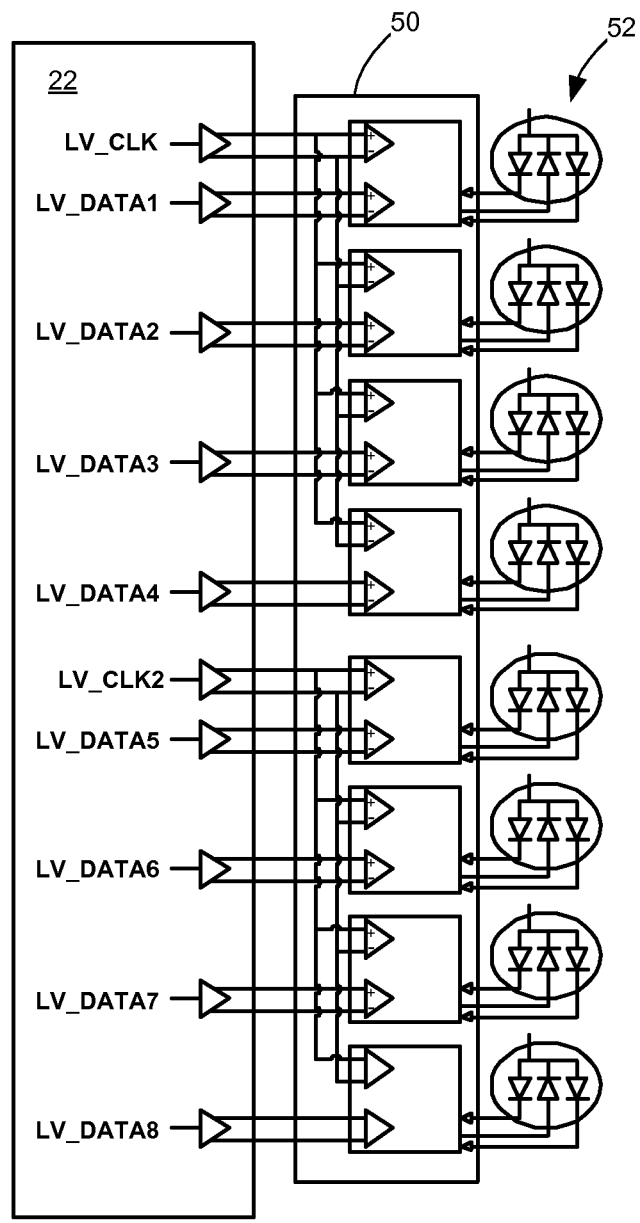
FIG. 8 is a circuit diagram illustrating a sixteen light source, color laser system utilizing the block diagram shown in FIG. 4.

With the above embodiments, one clock signal LV_CLK and four bit stream LV_DATA signals may be driven by LVDS transmitters 115 to the LVDS receivers 117 to control eight light sources, as shown in FIG. 4. In a 16 light source system, for example, the configuration may limit the number of LVDS pairs to ten pairs, as shown in FIG. 8, which otherwise cannot be achieved by implementing the conventional LSU system of FIG. 1 where the number of light sources correspond to the number of LVDS pairs. In the example shown, two clock signal LV_CLK interfaces are used due to load capacity constraints of a single clock signal LV_CLK interface. It will be appreciated, however, that a single clock signal LV_CLK interface may be utilized if such interface can efficiently provide a clock signal to all connected laser driver circuits.

Figure 9:
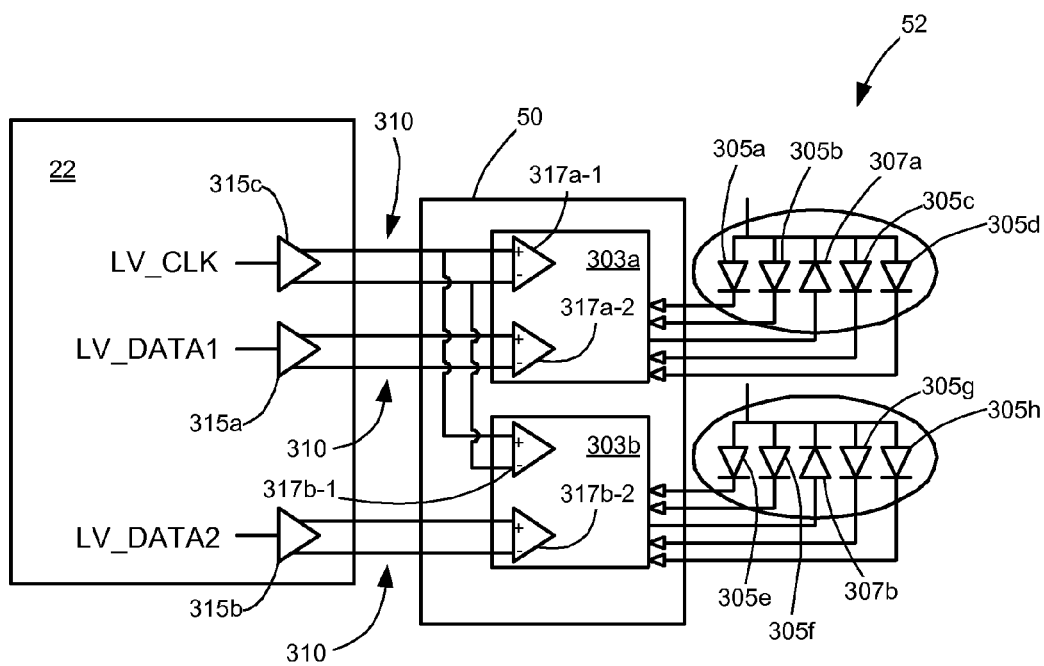
FIG. 9 is a circuit diagram illustrating driver circuitry of the laser scanning unit in FIG. 3 according to one example embodiment.

According to a further embodiment of the present disclosure, driver circuitry 50 of LSU 26 may utilize two laser driver circuits 303 communicating with controller 22 using three signal channels 310 to control eight laser diodes 305, as illustrated in FIG. 9. As shown, first laser driver circuit 303a may be coupled to and control laser diodes 305a, 305b, 305c, and 305d, and second laser driver circuit 303b may be coupled to and control laser diodes 305e, 305f, 305g, and 305h. Each laser driver circuit 303 may also be coupled to a laser output feedback device 307 which may be optically coupled to associated laser diodes 305. During an imaging operation, each laser driver circuit 303 may modulate each connected laser diode 305 based upon video information and control data communicated from controller 22.

Laser driver circuits 303 have their first LVDS receivers 317-1 coupled to the LVDS transmitter 315c of controller 22. Controller 22 may use LVDS transmitter 315c to transmit a common reference clock signal LV_CLK to each of the laser driver circuits 303. The second LVDS receivers 317-2 of each of the laser driver circuits 303 may each be connected to a corresponding LVDS transmitter 315 used by controller 22 to transmit laser modulation data. For example, LVDS transmitter 315a of controller 22 may be connected to second LVDS receiver 317a-2 of laser driver circuit 303a and used to transmit a first bit stream LV_DATA 1 containing image data used to modulate the laser beams emitted by laser diodes 305a, 305b, 305c, and 305d connected to laser driver circuit 303a. Similarly, a second bit stream LV_DATA 2 containing image data used to modulate laser beams emitted by light sources 305e, 305f, 305g, and 305h connected to laser driver circuit 303b may be transmitted by controller 22 using LVDS transmitter 315b.

With each laser driver circuit 303 having a single LVDS receiver 317-2 for receiving a laser modulation signal from controller 22 for modulating four laser diodes, image data for the four laser diodes may be encoded into a single bit stream prior to being outputted to one of the LVDS transmitters 315 by controller 22.

Figure 10A:
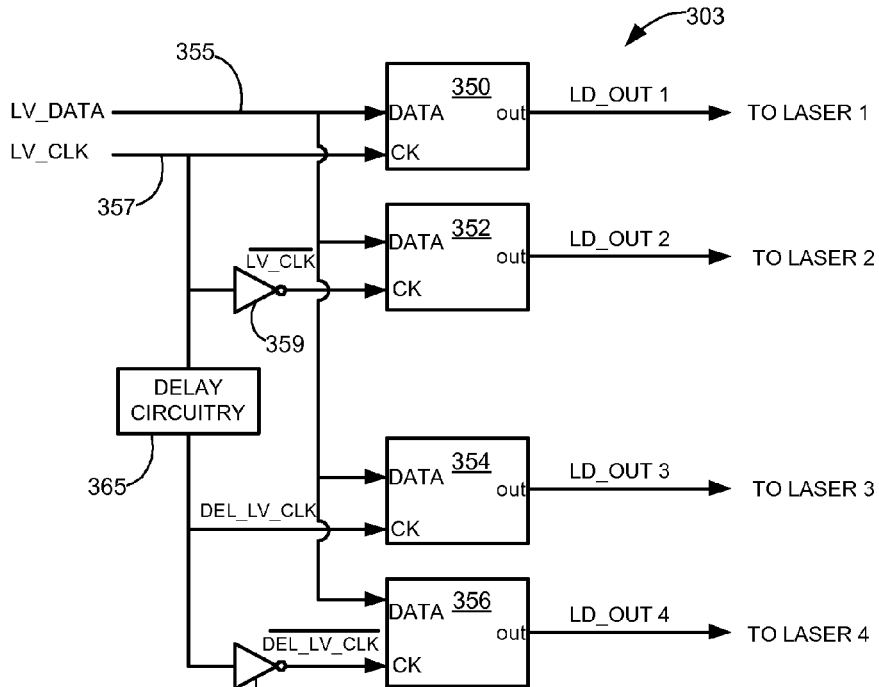
FIG. 10A is a block diagram of a laser driver circuit of the driver circuitry in FIG. 9 according to one example embodiment.

FIG. 10A illustrates a functional block diagram of each laser driver circuit 303 of FIG. 9 according to one example embodiment. Each laser driver circuit 303 may include four largely parallel connected flip-flops 350, 352, 354 and 356. Line 355 may be connected to the output of receiver 317-2 such that image data from controller 22 may be distributed to each of the four flip-flops 350, 352, 354 and 356 via line 355. Line 357 may be connected to the output of receiver 317-1 so that it carries clock signal LV_CLK from controller 22. Clock signal LV_CLK may be directly provided to flip-flop 350 via line 357. Logic inverter 359 includes an input connected to line 357 and an output connected to the clock input of flip-flop 352, so that flip-flop 352 receives a logically inverted form of clock signal LV_CLK. Delay circuitry 365 having an input connected to line 357 and an output connected to the clock inputs of flip-flops 354 and 356 generates a delayed clock signal DEL_LV_CLK that is shifted in time relative to clock signal LV_CLK such that its rising and falling edges occur between such edges of clock signal LV_CLK. Logic inverter 360 may be disposed between the output of delay circuitry 365 and the clock input of flip-flop 354. In this way, flip-flop 354 may directly receive delayed clock signal DEL_LV_CLK while flip-flop 356 may receive an inverted version of delayed clock signal DEL_LV_CLK. The non-inverted and inverted clock signals LV_CLK and DEL_LV_CLK may be used to control the outputs of flip-flops 350, 352, 354 and 356, as will be explained in detail below.

Figures 11A, 11B:
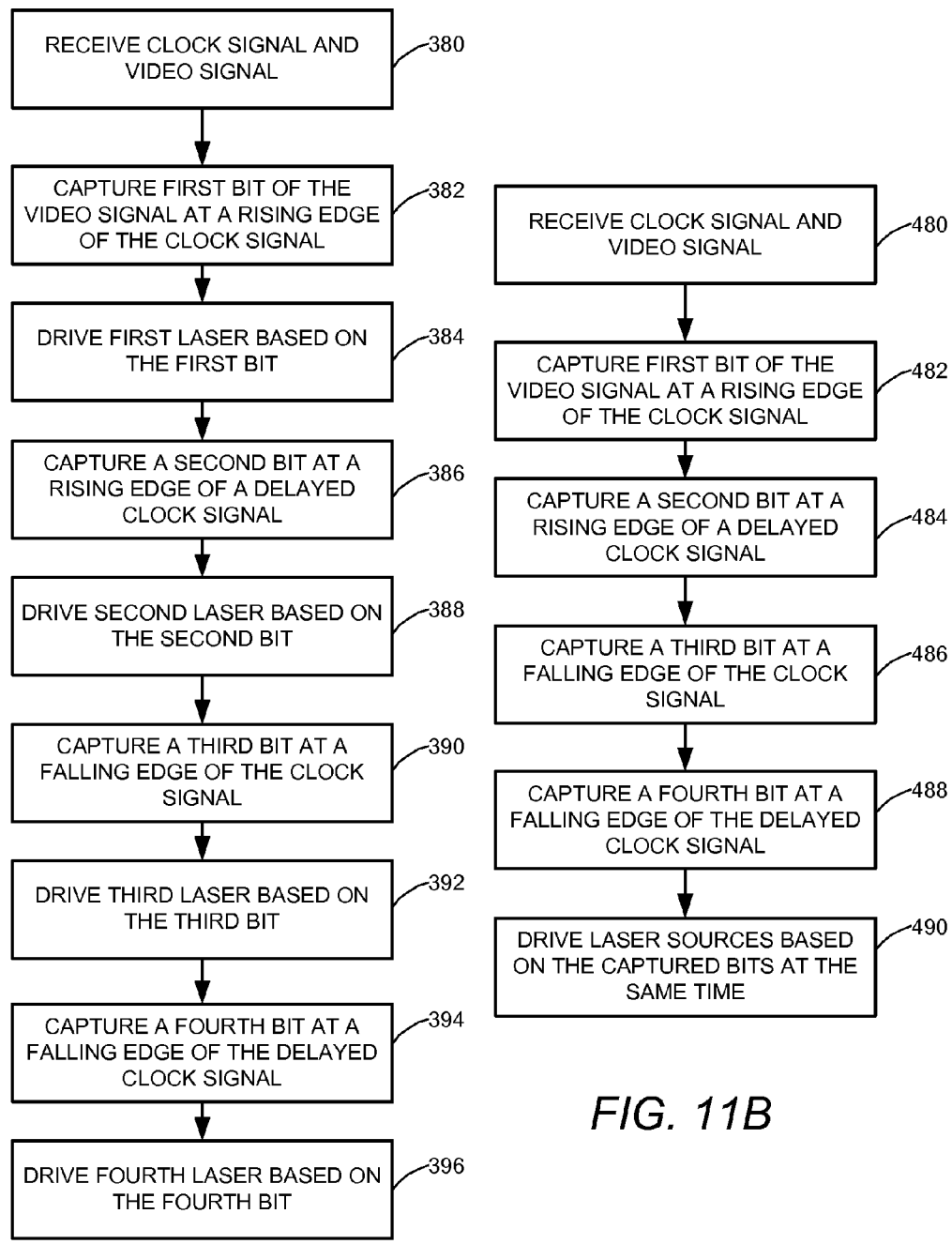
FIG. 11A is a flowchart illustrating a method of driving multiple light sources in accordance with the block diagram shown in FIG. 10A.
FIG. 11B is a flowchart illustrating a method of driving multiple light sources in accordance with the block diagram shown in FIG. 10B.
Figure 12A:
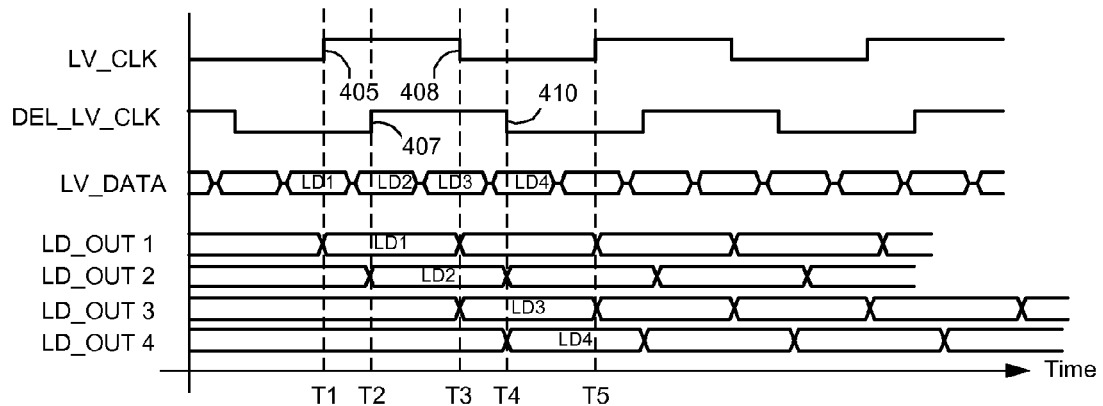
FIG. 12A is a timing diagram illustrating signals involved in the block diagram shown in FIG. 10A.

FIG. 11A shows a process of driving four light sources by each laser driver circuit 303 and FIG. 12A shows an example timing diagram corresponding to the signals described in accordance with the example embodiment shown in FIG. 10A. At block 380, flip-flops 350, 352, 354 and 356 may receive laser modulation data containing image information for four laser diodes LASER 1, LASER 2, LASER 3, and LASER 4 in the form of, for example, a bit stream LV_DATA, and corresponding non-inverted, inverted, delayed, or inverted-delayed clock signal LV_CLK discussed above. Laser diodes LASER 1-4 may correspond to the laser diodes 305 connected to a single driver circuit 303, such as, for example, laser diodes 305a, 305b, 305c, and 305d for driver circuit 303a.

During a clock cycle of clock signal LV_CLK, flip-flop 350 may capture a first bit LD1 from the bit stream LV_DATA at a rising edge 405 of clock signal LV_CLK at time T1 (block 382) and drive laser diode LASER 1 based on bit LD1 thereafter (block 384) as depicted by signal LD_OUT 1. Flip-flop 354 may capture a second bit LD2 of bit stream LV_DATA upon an occurrence of a rising edge 407 of delayed clock signal DEL_LV_CLK at time T2 (block 386) and drive laser diode LASER 2 based on bit LD2 (block 388) as depicted by LD_OUT 2. At a falling edge 408 of clock signal LV_CLK at time T3, flip-flop 352 may capture a third bit LD3 from bit stream LV_DATA (block 390) and drive laser diode LASER 3 based on bit LD3 (block 392) as depicted by signal LD_OUT 3. Subsequently, flip-flop 354 may capture a fourth bit LD4 at time T4, a predetermined period of time following the falling edge of clock signal LV_CLK corresponding to the delay through delay circuitry 365 (block 394), and drive laser diode LASER 4 based on bit LD4 (block 396) as depicted by signal LD_OUT 4.

In the example above, scan lines drawn by the four light sources may be skewed with respect to each other since the bits captured by flip-flops 350, 352, 354 and 356 are immediately provided to laser diodes LASER 1-4, as shown in FIG. 12A. In order to reduce the scan skew, each laser driver circuit 303 may be configured to drive laser diodes LASER 1, LASER 2, LASER 3, and LASER 4 based on the captured bits LD1, LD2, LD3, and LD4, respectively, substantially at the same time at a subsequent edge of the clock signal following the capture of the four bits, such as a clock edge in an immediately subsequent clock cycle.

Figure 10B:
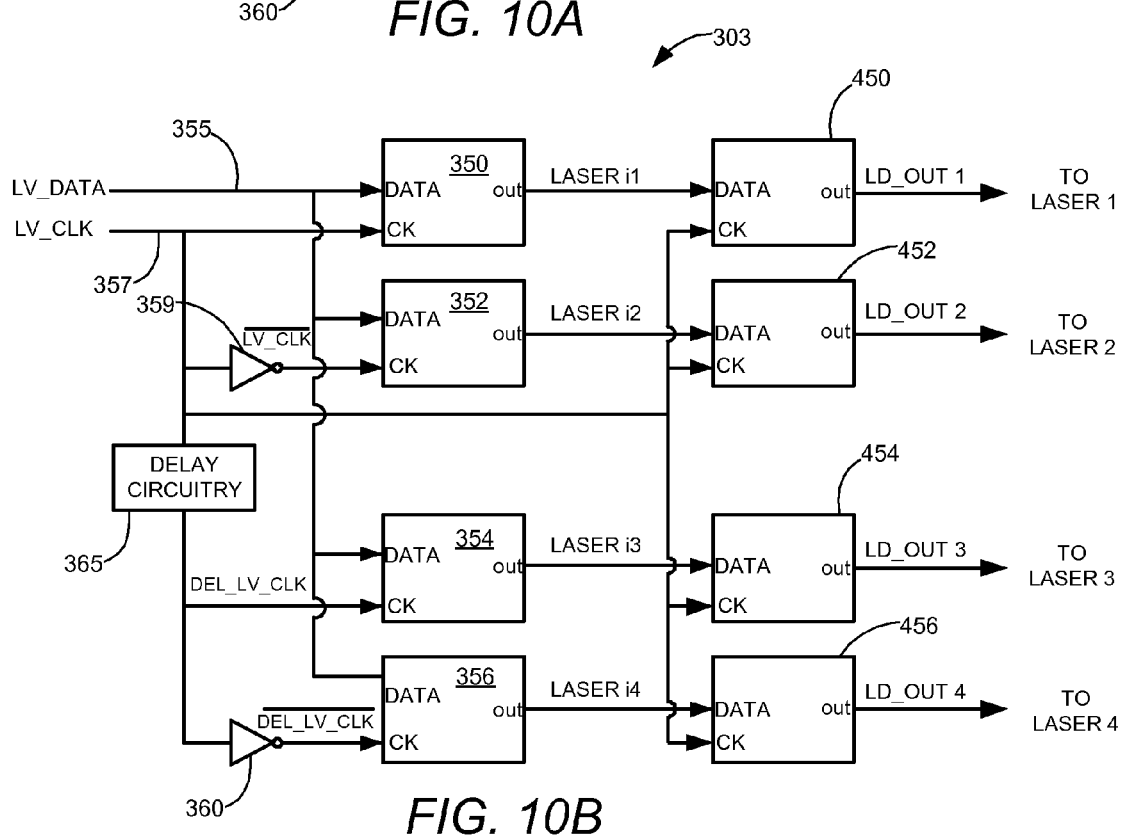
FIG. 10B is a block diagram of a laser driver circuit of the driver circuitry in FIG. 9 according to one example embodiment.

In FIG. 10B, the functional block diagram illustrated in FIG. 10A is shown with additional flip-flops 450, 452, 454, and 456 connected in series with the outputs of flip-flops 350, 352, 354, and 356, respectively. Flip-flops 450, 452, 454, and 456 may be clocked with the same clock signal LV_CLK from controller 22 via line 355 and may be configured to buffer the outputs of associated flip-flops 350, 352, 354, and 356, respectively. In particular, flip-flops 450, 452, 454, and 456 may not latch out the captured bits LD1, LD2, LD3, and LD4 captured by flip-flops 350, 352, 354, and 356, respectively, until a subsequent rising edge of clock signal LV_CLK in the next clock cycle, i.e., after the initial capture of the four bits LD1-LD4. In this way, connected light sources may be driven based on the captured bits substantially at the same time.

Figure 12B:
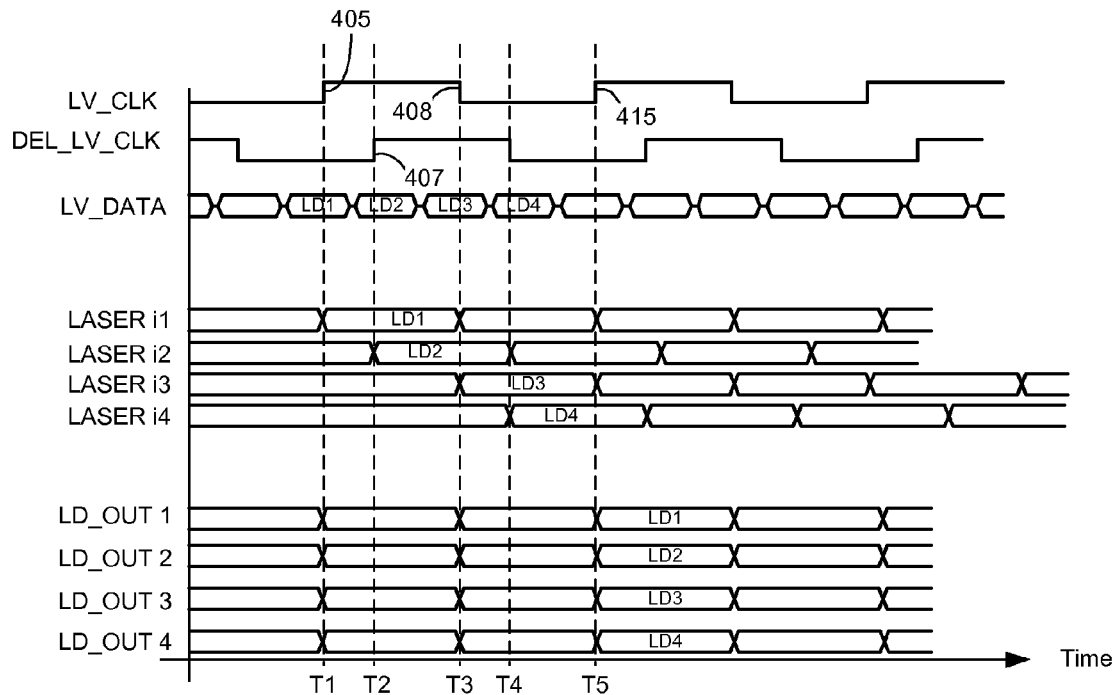
FIG. 12B is a timing diagram illustrating signals involved in the block diagram shown in FIG. 10B.

FIG. 11B shows a process of driving four light sources at substantially the same time based on the captured bits and FIG. 12B shows an example timing diagram corresponding to the signals described above, in accordance with the example embodiment shown in FIG. 10B. In the timing diagram, LASERi 1, LASERi 2, LASERi 3, and LASERi 4 may depict the timing of captured bits LD1, LD2, LD3, and LD4 within laser driver circuit 303 while LD_OUT 1, LD_OUT 2, LD_OUT 3, and LD_OUT 4 may depict the actual timing the captured bits are provided to LASER 1, LASER 2, LASER 3, and LASER 4, respectively. At block 480, each laser driver circuit 303 may receive bit stream LV_DATA and corresponding clock signals as mentioned above with respect to FIG. 10A. After capturing bit LD1 in flip-flop 350 at a rising edge 405 of clock signal LV_CLK at time T1 (block 482), bit LD2 in flip-flop 354 at a rising edge 407 of delayed clock signal DEL_LV_CLK at time T2 (block 484), bit LD3 in flip-flop 352 at a falling edge 408 of clock signal LV_CLK at time T3 (block 486), and bit LD4 in flip flop 354 at a falling edge 410 of the delayed clock signal DEL_LV_CLK at time T4 (block 488), each flip-flop 350, 352, 354 and 356 may hold its respective captured bit at least until the next clock cycle of clock signal LV_CLK. Upon occurrence of the next rising edge of clock signal LV_CLK, such as at time T5, bit values LD1, LD2, LD3 and LD4 are loaded into flip-flops 450, 452, 454 and 456, respectively. At this time, laser diodes LASER 1, LASER 2, LASER 3, and LASER 4 are driven based on captured bit values LD1, LD2, LD3, and LD4, respectively, substantially at the same time at time T5.

Figure 13:
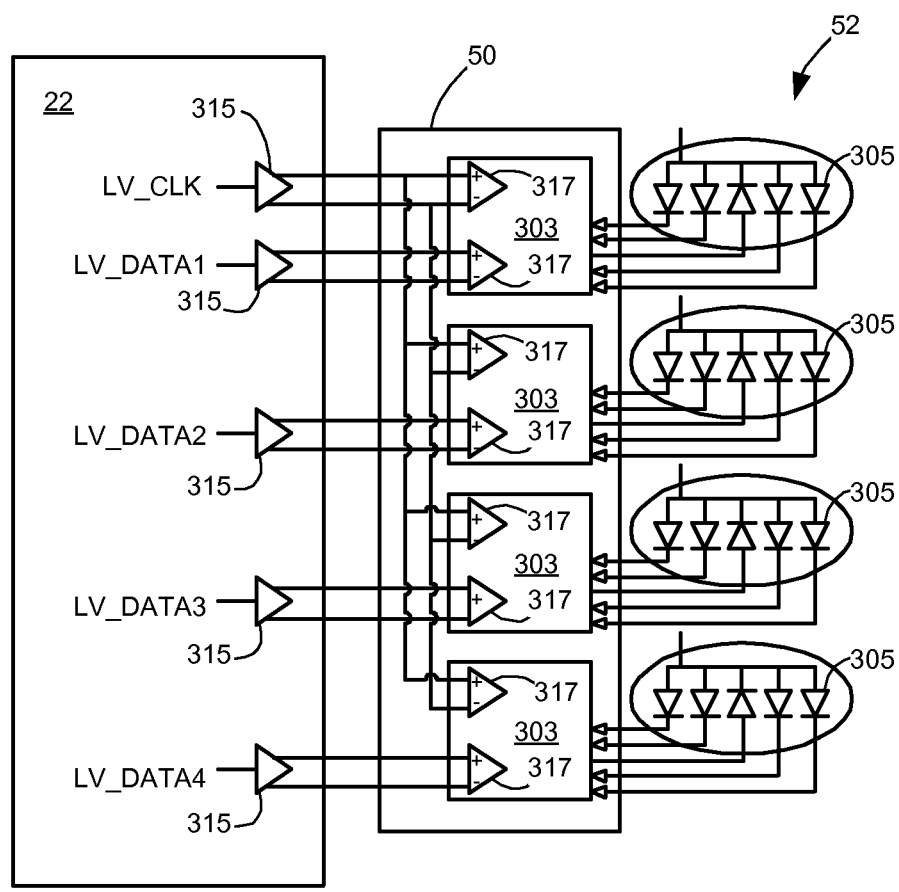
FIG. 13 is a circuit diagram illustrating a sixteen light source, color laser system utilizing the configuration shown in FIG. 9.

With the above embodiments, one clock signal LV_CLK and two data signals LV_DATA may be driven by the LVDS transmitters 315 to the LVDS receivers 317 at the laser driver circuits 303 to control eight light sources. In a 16 light source laser system, for example, the configuration may be able to limit the number of LVDS pairs to 5 pairs, as shown in FIG. 13, provided that the clock signal LV_CLK interface can efficiently supply a clock signal to all four laser driver circuits 303. In the figure shown, laser diodes 305 connected to a common laser driver circuit 303 may correspond to one of the CMYK color image planes such that a laser modulation signal transmitted over a single channel is used to modulate four laser diodes that form latent images on a common photoconductive drum.

The description of the details of the example embodiments has described capturing bits of information from a bit stream at rising edges of various clock signals. However, it will be appreciated that bits may also be captured by other suitable means such as, for example, by reversing the edge triggering such that bits are captured at falling edges of the various clock signals. Furthermore, while specific embodiments have been described with particularity above, it will be appreciated that the present disclosure is equally applicable to other adaptations. For example, the present disclosure is not limited to using the specific configurations and number of laser driver circuits, flip-flops, laser diodes, and other components described. Instead, other configurations and any plural number of laser driver circuits, flip-flops, laser diodes, and other components may be used. As mentioned, light sources other than laser diodes may be utilized.

The foregoing description of several methods and example embodiments has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An imaging apparatus for generating an image, comprising:
    a first light source and a second light source controllable to emit light beams;
    a driver circuit for controlling the first and second light sources;
    a first differential signal channel for communicating a clock signal to the driver circuit; and
    a second differential signal channel for transmitting a bit stream containing image information to the driver circuit;
    wherein the driver circuit is configured to capture a first bit from the bit stream in response to one of a rising edge and a falling edge of the clock signal, capture a second bit from the bit stream in response to the other of the rising edge and the falling edge of the clock signal, and drive the first and second light sources based on the captured first and second bits, respectively; and
    wherein the first and second bits of the bit stream are captured in a same clock cycle of the clock signal, and wherein the imaging apparatus further comprises a third light source and a fourth light source controlled by the driver circuit to emit light beams, wherein the driver circuit is further configured to capture a third bit and a fourth bit from the bit stream during the same clock cycle in which the first and second bits are captured but at times other than during an occurrence of an edge of the clock signal, and drive the third and fourth light sources based on the captured third and fourth bits, respectively.

2. The imaging apparatus of claim 1, wherein the first and second light sources are driven by the driver circuit based on the captured first and second bits, respectively, substantially at the same time at a subsequent edge of the clock signal following the capture of the first and second bits.

3. The imaging apparatus of claim 1, wherein the driver circuit captures the third and fourth bits during a first half-cycle and a second half-cycle of the same clock cycle of the clock signal, respectively.

4. The imaging apparatus of claim 1, wherein the third and fourth light sources are driven by the driver circuit based on the captured third and fourth bits, respectively, substantially at the same time at an edge of the clock signal in a subsequent clock cycle from the clock cycle in which the first, second, third and fourth bits are captured.

5. The imaging apparatus of claim 1, wherein the driver circuit includes delay circuitry for delaying the clock signal communicated over the first differential signal channel to generate a delayed clock signal, edges of the delayed clock signal occur between the rising and falling edges of the clock signal, the edges of the delayed clock signal triggering the capture of the third and fourth bits.

6. The imaging apparatus of claim 1, wherein each of the first and second differential signal channels comprises a low-voltage differential signaling channel.

7. A scanning system for use in an imaging apparatus, comprising:
a first light source and a second light source controllable to emit light beams for generating an image;
driver circuitry having first and second outputs connected to the first and second light sources, respectively, for controlling the first and second light sources;
a signal transmitter including a first interface for communicating a clock signal to the driver circuitry and a second interface for communicating an image information signal to the driver circuitry;
wherein, during a first clock cycle of the clock signal, the driver circuitry captures first bit information from the image information signal at a rising edge of the clock signal and second bit information from the image information signal at a falling edge of the clock signal, the driver circuitry thereafter configured to drive the first and second light sources based on the first and second bit information captured, respectively; and
a third light source and a fourth light source, wherein the driver circuitry further includes third and fourth outputs connected to the third and fourth light sources over third and fourth signal lines, respectively, the driver circuitry configured to capture third bit information and fourth bit information from the image information signal during the first clock cycle at times other than during an occurrence of an edge of the first clock signal, and drive the third and fourth light sources based on the captured third and fourth bit information, respectively.

8. The scanning system of claim 7, wherein the driver circuitry drives the first and second light sources based on the first and second bit information, respectively, substantially at the same time at an edge of the clock signal during a second clock cycle following the first clock cycle.

9. The scanning system of claim 7, wherein the driver circuitry captures the third and fourth bit information during a first half-cycle and a second half-cycle of the first clock cycle, respectively.

10. The scanning system of claim 7, wherein driver circuitry drives the third and fourth light sources based on the captured third and fourth bit information, respectively, substantially at the same time at an edge of the clock signal during a second clock cycle following the first clock cycle.

11. The scanning system of claim 7, wherein the driver circuitry includes a delay line for delaying the clock signal to generate a delayed clock signal that is shifted in time relative to the clock signal in such a manner that edges of the delayed clock signal occur between edges of the clock signal, the capture of the third and fourth bits occurring at the edges of the delayed clock signal.

12. The scanning system of claim 7, wherein the first and second interface of the signal transmitter each comprises a low-voltage differential signaling interface.

13. A method for controlling a scanning system in an imaging apparatus, comprising:
receiving a clock signal and a bit stream containing image information communicated over a first differential signal channel and a second differential signal channel, respectively;
capturing a first bit from the bit stream at a rising edge of a clock signal;
capturing a second bit from the bit stream at a falling edge of the clock signal in a same clock cycle in which the first bit is captured;
driving a first light source and a second light source based on the captured first and second bits, respectively;
capturing a third bit and a fourth bit from the bit stream during the same clock cycle in which the first and second bits are captured at times other than during an occurrence of an edge of the clock signal; and
driving a third light source and a fourth light source based on the third and fourth bits, respectively.

14. The method of claim 13, wherein the driving of the first and second light sources comprises driving the first and second light sources with the first and second bits, respectively, at substantially the same time in a subsequent clock cycle of the clock signal.

15. The method of claim 13, wherein the driving of the third and fourth light sources comprises driving the third and fourth light sources with the third and fourth bits, respectively, at substantially the same time in a subsequent clock cycle of the clock signal.

16. The method of claim 13, wherein the driving of the first, second, third, and fourth light sources comprises driving the first, second, third, and fourth light sources with the first, second, third, and fourth bits, respectively, at substantially the same time in a subsequent clock cycle of the clock signal.

17. The method of claim 13, further comprising delaying the clock signal communicated over the first differential signal channel by a predetermined time delay to produce a delayed clock signal having edges that occur between edges of the clock signal, wherein the capturing of the third and fourth bits occur at the edges of the delayed clock signal.

18. An imaging apparatus for generating an image, comprising:
a first light source and a second light source controllable to emit light beams;
a driver circuit for controlling the first and second light sources;
a first differential signal channel for communicating a clock signal to the driver circuit; and a second differential signal channel for transmitting a bit stream containing image information to the driver circuit;

wherein the driver circuit is configured to capture a first bit from the bit stream in response to one of a rising edge and a falling edge of the clock signal, capture a second bit from the bit stream in response to the other of the rising edge and the falling edge of the clock signal, and drive the first and second light sources based on the captured first and second bits, respectively; and wherein the first and second light sources are driven by the driver circuit based on the captured first and second bits, respectively, substantially at the same time at a subsequent edge of the clock signal following the capture of the first and second bits.

19. A scanning system for use in an imaging apparatus, comprising:

a first light source and a second light source controllable to emit light beams for generating an image;

driver circuitry having first and second outputs connected to the first and second light sources, respectively, for controlling the first and second light sources;

a signal transmitter including a first interface for communicating a clock signal to the driver circuitry and a second interface for communicating an image information signal to the driver circuitry;

wherein, during a first clock cycle of the clock signal, the driver circuitry captures first bit information from the image information signal at a rising edge of the clock signal and second bit information from the image information signal at a falling edge of the clock signal, the driver circuitry thereafter configured to drive the first and second light sources based on the first and second bit information captured, respectively; and wherein the driver circuitry drives the first and second light sources based on the first and second bit information, respectively, substantially at the same time at an edge of the clock signal during a second clock cycle following the first clock cycle.

20. A method for controlling a scanning system in an imaging apparatus, comprising:

receiving a clock signal and a bit stream containing image information communicated over a first differential signal channel and a second differential signal channel, respectively;

capturing a first bit from the bit stream at a rising edge of a clock signal;

capturing a second bit from the bit stream at a falling edge of the clock signal in a same clock cycle in which the first bit is captured; and driving a first light source and a second light source based on the captured first and second bits, respectively;

wherein the driving of the first and second light sources comprises driving the first and second light sources with the first and second bits, respectively, at substantially the same time in a subsequent clock cycle of the clock signal.

* * * * *